March 12, 1968         J. NANIGIAN         3,372,587

HEAT FLOW DETECTOR HEAD

Filed Nov. 3, 1964

INVENTOR.
JACOB NANIGIAN
BY
*William R. Wright*
HIS AGENT

United States Patent Office 3,372,587
Patented Mar. 12, 1968

3,372,587
HEAT FLOW DETECTOR HEAD
Jacob Nanigian, Needham, Mass., assignor to Nanmac Corporation, Needham Heights, Mass., a corporation of Maryland
Filed Nov. 3, 1964, Ser. No. 408,595
4 Claims. (Cl. 73—190)

ABSTRACT OF THE DISCLOSURE

A detector head for measuring the heat flow through the wall of a chamber of a given material and surrounding a heat source, having a flat plate at right angles to the heat flow abutting a detector head body of the same material as the wall, and a plurality of dissimilar thermocouple conductors attached to the plate in the plane thereof. The head is provided with means for mounting it in the wall and with means for connecting measuring instruments to the thermocouple conductors to measure temperature with respect to time.

---

The present invention relates to heat flow rate measurement through a wall exposed to a source of heat. It relates more particularly to an improved device for detecting heat flow wherein the device measures the heat flow rate with great rapidity, accuracy and dependability.

One problem associated with the measurement of heat flow through the walls surrounding a source of heat such as, for instance, a combustion chamber or a very high-speed wind tunnel, is that the heat flow must be measured very rapidly so that any excessive flow will be detected and corrected before damage will be done to the structure. Often this is a matter of fractions of a second, particularly where very high temperatures may be involved. The present invention meets this need with a response time in the low milliseconds and does so through its utilization of a third intermediate metal which is very thin and of known dimensions and properties and which acts as a neutral element between two dissimilar elements of a thermocouple. Its accuracy is also great because of its two-dimensional aspects and large contact area as compared with the relatively small contact area of an ordinary thermocouple or thermopile. Furthermore its accuracy is increased by locating the thermocouple lead wires in the vicinity of the intermediate metal plate parallel to the plate so that both are heated simultaneously and hence conducion errors caused by the lead wires are minimized.

It is, therefore, an object of the present invention to provide an improved heat flow detector which is at once more accurate and of quicker response than heretofore and is adapted to be embedded in the wall surrounding a heat source with external connection to suitable measuring instruments.

It is also an object of the present invention to provide heat flow detector wherein the temperature of a very thin neutral element of known dimension is measured in order to determine the heat flow.

It is also an object of the present invention to provide a simple, light-weight heat flow detector of the foregoing type which is of extremely quick response, accurate and dependable.

Figure 1:
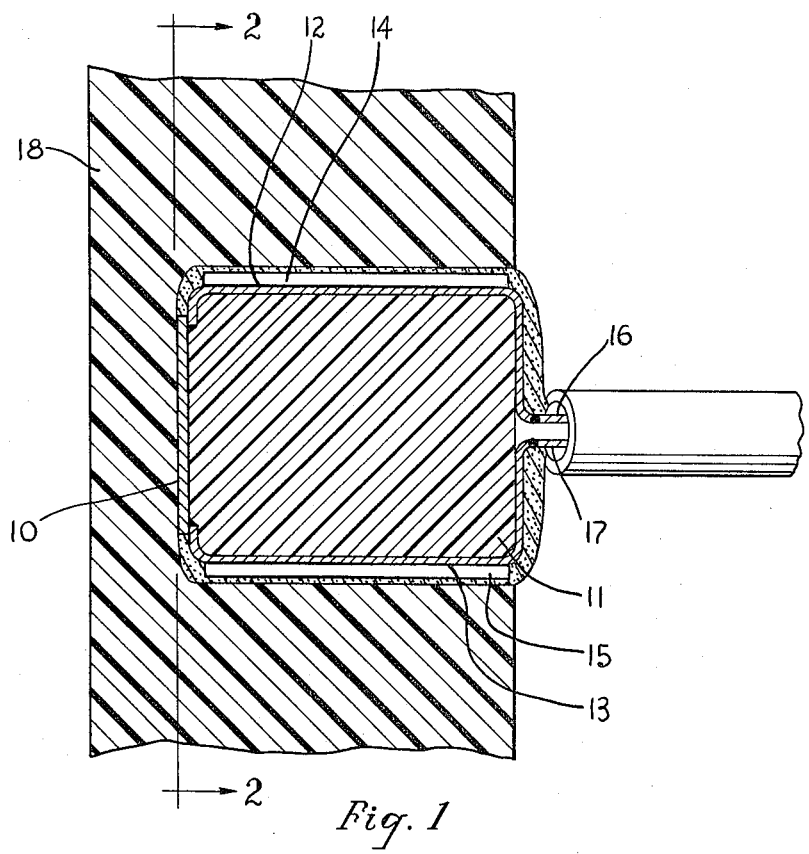
Figure 2:
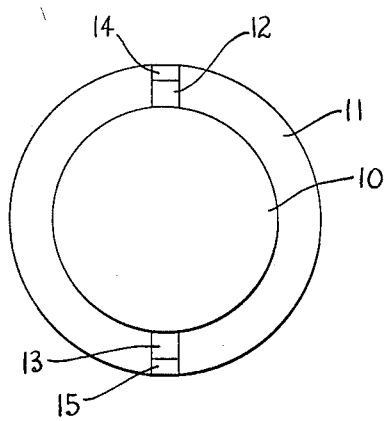

In the drawings:
FIGURE 1 is a longitudinal cross sectional view of the heat flow detector embedded in a wall adjacent to a heat source.
FIGURE 2 is an end view of the heat flow detector before installation in the wall.

Basically, this heat flow detector measures the heat flow in a material by measuring the temperature rise or fall in a given time of a known metallic plate located at a desired location in the material, usually the wall surrounding a heat source. In this way, the internal energy of the plate is obtained as a function of time, and the rate of heat flow is proportional to the derivative of the temperature curve with respect to time. For example, in determining the heat flow in a material at time $t_2$, the internal energy $Q_2$ of the metallic plate is calculable directly from the measured temperature, the mass of the disc and the thermal conductivities at time $t_2$. Similarly the internal energy $Q_1$ and $Q_3$ at time $t_1$ (just prior to time $t_2$) and again at time $t_3$ (just after time $t_2$) can be calculated. The difference between $Q_1$ and $Q_3$ is then the average rate of heat flow through the material at time $t_2$.

With reference to FIGURE 1 of the drawings, a very thin disc or plate 10 of precisely known dimensions and thermal properties is fastened to a plug 11 on the face thereof by means of a high temperature resistant epoxy cement or the like. Plug 11 is made of the same material as the wall 18 into which it is to be inserted and is made slightly larger in diameter or width than the disc or plate as shown. Attached in thermally-conductive relationship to opposite edges of the plate 10, approximately 180 degrees from each other, are thermocouple ribbons 12 and 13, each of dissimilar thermocouple material such as iron and constantan. Chromel and Alumel or other suitable thermocouple materials. Ribbons 12 and 13 proceed radially outward from plate 10 in parallel relationship thereto for a short distance and then are bent at right angles after which they pass through grooves 14 and 15, respectively, along the exterior of plug 11 and then emanate therefrom passing along the outer or rear face of plug 11. The purpose for extending the ribbons radially in the vicinity of the plate is so that both the plate and ribbons are located in the same plane thus both are heated simultaneously. As a result, conduction errors caused by the ribbons are minimized. The reason for using ribbon elements instead of the conventional round wires is that ribbons have the best geometry with respect to contact area, bonding qualities and large surface to cross-sectional area ratio which in turn yields faster response times and also further minimizes conduction errors. These ribbons are bonded firmly in place and are insulated by filling of the grooves with high temperature-resistant adhesive such as an epoxy. Also, where the ribbons emanate from plug 11 and pass along its rear, they are bonded to it and "potted" with the adhesive. The thermocouple ribbons then are attached to electrically and preferably thermally insulated leads 16 and 17 which are in turn connected to suitable instrumentation (not shown) which measures the electrical signal and indicates the temperature change with respect to time. Suitable equipment can be connected to the instrumentation to actuate shut-down or control systems as desired.

Plug 11 is inserted in a recess in the wall 18 in the manner shown and is "potted" in the recess by filling of any gaps between plug 11 and wall 18 with the same type of adhesive as mentioned previously. It is important that the plane of the plate 10, or neutral element, be normal to the heat flow which would ordinarily be the condition if the plate were parallel to the inner surface of wall 18 as is the case in FIGURE 1. It is also important that the length of the plug 11 be such that it is substantially flush with the outer surface of wall 18 so that no error is introduced because of any variation in the thickness of the wall brought by the plug. Great care must be exercised during the installation and "potting" to ensure that no air bubbles become trapped in the blind recess since any such would cause errors due to their interference with the normal flow of heat by virtue of their different heat transmission characteristics as compared with the wall 18.

After installation, the plug calorimeter or heat flow detector head becomes in essence an integral part of the test wall and since the metal plate is in good direct thermal contact with the wall and is backed up with a rod of material identical to that of the wall material, the plate assumes with precision substantially the temperature of the wall at all times.

As previously mentioned, the plate is made of any thin metallic material and is as thin as is structurally feasible. Stainless steel type 301 is one material which is desirable for this purpose although other metallic materials may be used such as copper, platinum, gold, iridium and tungsten for example. When stainless steel is used, it is expected that it will be about .001 inch thick which is a practicable size although thinner could be used and thicker could also be used although the response time would increase with an increase in thickness and the resultant mass and heat capacity of the disc would undesirably increase the response time. The plate should always be less than .010 inch in thickness or else the response time will be too long to be effective. The plate can be made by stamping, plating or vapor deposition to give an extremely thin metallic layer. The thinner the layer, the faster the response and the better the accuracy of the heat flow detector because of the lessened thermal disturbance to the structure wherein the heat transfer is being measured. Since the thickness of the plate is kept at a minimum, the inherent response time of the plate to fluctuating temperature is in the order of low milliseconds.

Since both dissimilar thermocouple ribbons are electrically and separately connected to the plate, the plate acts as a neutral element. By virtue of the Law of Intermediate Metals regarding thermocouples, the electromotive force generated by the plate at each of the junctions to its underside cancel each other out automatically, leaving the observed electromotive force as that generated by the dissimilar thermocouple metals only provided that the plane of the plate is normal to the direction of the heat flow. Any pair of standard thermocouple metals can be joined to the plate and the plate can be made of any desired metal, the individual choices being dependent upon the expected temperature range, desired sensitivity of the signal, environmental conditions and the like.

While there have been shown and described and pointed out the fundamental novel features of this invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A heat flow detector head including a body of a given material adapted to measure the heat flow through the wall of a chamber of the same material surrounding a heat source comprising a thin flat thermally conductive plate of known thermal properties disposed normal to the heat flow, a plurality of dissimilar thermocouple conductors attached to the plate in the plane thereof and in thermal conducting relationship thereto, means for electrically insulating the thermocouple wires from each other, means for mounting the head in the wall so as to be flush with the outer surface thereof, and means for connecting measuring instruments to said thermocouple conductors to measure temperature with respect to time.

2. The invention set forth in claim 1 with the dissimilar thermocouple conductors in ribbon form in the vicinity of the plate.

3. The invention set forth in claim 1 with the flat plate being in the form of a disc.

4. The invention set forth in claim 1 with the flat plate being in the form of a rectangle.

References Cited

UNITED STATES PATENTS

| | | | |
|---|---|---|---|
| 3,018,663 | 1/1962 | Dunlop | 73—341 |
| 3,123,996 | 3/1964 | Musial | 73—15 |

RICHARD C. QUEISSER, *Primary Examiner.*

JAMES J. GILL, *Examiner.*

EDDIE SCOTT, *Assistant Examiner.*